July 20, 1948.                E. H. LAND                2,445,581
       TREATMENT OF POLARIZING POLYVINYL ALCOHOL-IODINE
           SORPTION COMPLEX IMAGE WITH BORIC ACID
                   Filed Dec. 9, 1943
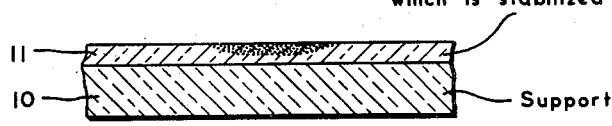
Molecularly oriented polyvinyl alcohol having a dichroic sorption complex of iodine which forms a light-polarizing image and which is stabilized with boric acid.
11 —
10 —                              — Support
                                    INVENTOR
                                 Edwin H. Land
                              BY Donald L. Brown
                                    Attorney Patented July 20, 1948

2,445,581

UNITED STATES PATENT OFFICE 2,445,581

TREATMENT OF POLARIZING POLYVINYL ALCOHOL-IODINE SORPTION COMPLEX IMAGE WITH BORIC ACID

Edwin H. Land, Cambridge, Mass., assignor to Polaroid Corporation, Cambridge, Mass., a corporation of Delaware Application December 9, 1943, Serial No. 513,629

5 Claims. (Cl. 95—88)

This invention relates to images formed by the action of dyes or stains in plastics, and more particularly to dichroic images formed in molecularly oriented plastics and to methods and materials for improving the physical and pictorial properties of such images.

It is one object of the present invention to provide a novel method of increasing the stability of dichroic images, and particularly dichroic images produced in a molecularly oriented, transparent plastic, such as a linear high polymer of a vinyloxy compound, which plastic is adapted to form a dichroic sorption complex with a dichroic dye, such as iodine.

Another object is to provide a novel method of the above character whereby the pictorial quality of the image is improved.

A further object of the invention is to provide novel materials and solutions for carrying out the above methods.

Further objects are the provision of a novel dichroic image comprising iodine in a molecularly oriented plastic layer or sheet, which image is highly stable to light, moisture and heat; the provision of a novel method whereby at least the surface layer of said plastic is chemically converted to give a chemical complex which has the desired light-, heat-, and moisture-resistant properties without affecting the image density and without appreciably decreasing the dichroic ratio of the image; and the provision of novel materials and a novel method of producing said dichroic image of improved stability whereby the pictorial qualities of the image, such as clarity and brilliance, are also improved.

Other objects of the invention will in part be obvious and will in part appear hereinafter.

The invention accordingly comprises the several steps and the relation and order of one or more of such steps with respect to each of the others, and the product possessing the features, properties, and the relation of elements, which are exemplified in the following detailed disclosure, and the scope of the application of which will be indicated in the claims.

The present invention comprehends a method of stabilizing and improving the quality of a print comprising an image, such as a design or a photographic reproduction, formed by a suitable dye or stain in a supporting medium comprising a plastic, and is particularly applicable to images produced in a linear high polymer of a vinyloxy compound having hydroxyl groupings by a dye compound with which said polymer, when in a molecularly oriented condition, forms a dichroic sorption complex. The invention is illustrated, by way of example, as applied to dichroic images consisting of iodine in an oriented polyvinyl alcohol and is particularly adapted for improving the stability and pictorial quality of images of this type. One method of obtaining such images is described in the Land Patent No. 2,315,373, issued September 14, 1943. However, it is to be understood that the present invention is not limited to dichroic images so obtained and is equally applicable to dichroic images formed in polyvinyl alcohol by other methods. For example, it is possible to obtain a dichroic image comprising iodine in polyvinyl alcohol by chemically transforming an exposed silver halide emulsion in oriented polyvinyl alcohol so that the latent silver halide image is replaced by iodine or by removing or converting the iodine content in a predetermined area of a uniformly stained sheet of polyvinyl alcohol. The dichroic images, which are the products of these and other methods, may all be processsed in accordance with the present invention to give images which are more stable and which have improved pictorial qualities.

In accordance with the method of the invention, iodine images in polyvinyl alcohol may be rendered more stable by reaction with a stabilizing agent, such for example as a water-soluble boron compound. Examples of suitable agents of this character are those which in water solution give boric acid, and these include boric acid, methyl borate, boron trifluoride and boric anhydride. The reaction of boric acid with a polyvinyl alcohol-iodine complex gives a product which possesses the dichroic properties of the polyvinyl alcohol-iodine complex, but which has in addition a greater resistance to the effects of actinic light, heat, and moisture. This stabilizing reaction is preferably carried out by immersing the plastic sheet or that portion thereof containing the iodine in a solution of the boric acid. The time necessary to stabilize an image by reaction in a solution of this character is not critical and depends on the concentration of the boric acid in the solution. In a 5% boric acid solution good results are obtained by immersing the print in the solution for from thirty seconds to two minutes.

The reaction of the boron compound with the iodine-polyvinyl alcohol complex also increases the density of the iodine image and thereby affects the pictorial quality thereof. One method of compensating for the effect of this increase in density on pictorial quality is to begin the stabilization reaction with a dichroic image having a density somewhat less than the optimum density whereby the increase in density during the reaction will give, as a product, an image of the desired density. However, it is possible to improve the pictorial quality of the image and to compensate for its increase in density by bleaching the image during or after the stabilization. To obtain optimum pictorial quality, it is preferable to begin the stabilization with dichroic images which have a pictorial density greater than the density giving optimum pictorial quality so that there is obtained during the bleach a greater visual control over the quality of the finished picture.

In the preferred form of the invention, there is included in the boric acid solution a bleaching agent, i. e., an agent which is adapted to react with the iodine to form a colorless, water-soluble reaction product, thereby diminishing the density of the iodine image. Any chemical agent capable of bleaching iodine and which does not react with the boric acid, or other component of the solution, to prevent, destroy, or inhibit the stabilization effect of the acid or to produce undesirable stains in the image, may be used for this purpose. Sodium thiosulfate is preferred although such other bleaching agents as sodium sulfite, sodium sulfide, stannous chloride, ferrous chloride, thiocarbamide and sodium perborate may be used. Although the bleaching agent is preferably employed in the same solution as the boric acid, it is to be understood that a separate solution containing this agent may be used in which the print is immersed after being stabilized in the boric acid solution.

Where a bleaching agent for iodine is used, whether in the same solution with the stabilizing agent or in a separate solution, it is desirable to carefully time the reaction, as for example, by observing the effect of the solution on the pictorial quality of the print. This avoids overbleaching. Moreover, by careful inspection of the image as it is treated with the bleach, or by careful control of the timing of the bleaching when images of predetermined density are being treated in solutions of known strength, an image of improved pictorial quality, i. e., an image having greater brilliance and clarity than the unstabilized polyvinyl alcohol-iodine image, may be obtained.

It is possible to accelerate the action of the bleaching agent by adding to the solution containing said agent a suitable compound which tends to increase the solubility of iodine in water solutions and examples of preferred compounds for this purpose are potassium iodide, sodium iodide, and ammonium iodide. Other compounds which may be used for the purpose of increasing the iodine solubility are potassium bromide, sodium bromide and ammonium bromide, of which ammonium bromide gives best results. Where a compound for increasing the solubility of iodine is used in combination with the bleaching agent, it becomes possible to utilize a lesser amount of said bleaching agent to produce a given reduction in density and when a decreased amount of the bleaching agent is used, the time range of the reaction is extended and greater latitude and controllability of the bleaching operation are achieved. When the bleaching agent is not used in the stabilizing solution or in a subsequent bath, it of course becomes unnecessary to employ a compound for increasing the solubility of the iodine.

An example of a solution containing a stabilizing agent, a bleaching agent and an agent for accelerating the action of the bleach whereby satisfactory results are obtained, comprises the following ingredients in the specified proportions:

| | Cubic centimeters |
|---|---|
| 3% boric acid solution | 50 |
| 1% sodium thiosulfate solution | 1 |
| 50% solution of potassium iodide | |

The stability of a dichroic image to light, heat and moisture may thus be increased by reaction with a stabilizing solution which may, but does not necessarily, contain suitable ingredients for controlling the density and improving the pictorial quality of the print, or which may be, but is not necessarily, followed by reaction in a solution containing said ingredients. It may also be desirable in any or all of these solutions to include one or more compounds which are adapted to decrease the solubility of the plastic in said solutions. For polyvinyl alcohol, suitable agents for decreasing solubility are sodium sulfate, ammonium sulfate, potassium sulfate, sodium chloride, ammonium chloride and potassium chloride and of these, sodium sulfate is preferred. An example of a solution containing an agent for decreasing the solubility of polyvinyl alcohol and satisfactory for stabilizing a polyvinyl alcohol-iodine image is one consisting of:

| | | |
|---|---|---|
| Boric acid | grams | 3 to 5 |
| Sodium sulfate | do | 5 to 10 |
| Water | cc | 100 |

An example of a preferred solution for fixing a dichroic image of iodine in polyvinyl alcohol whereby both the stability and pictorial quality of the image are improved and which contains an agent for inhibiting dissolution of polyvinyl alcohol, consists of the following ingredients:

| | | |
|---|---|---|
| Boric acid | grams | 15 |
| Sodium sulfate (anhydrous) | do | 5 |
| Potassium iodide | do | 6.7 |
| Sodium thiosulfate | do | .35 |
| Water to make | cc | 400 |

Treatment of the dichroic image in the above and other aforementioned solutions may be carried out, for example, by dipping or otherwise immersing the print therein and a print of good quality may be obtained in said last-named solution by immersion for approximately 1½ minutes.

The foregoing examples are illustrative only of operative embodiments of the present invention. It is to be understood that none of the times, ingredients, or proportions are critical except insofar as they are made so by the other ingredients. Similarly, no mention of specific temperatures has been made because temperatures are not critical and the reactions with any of the solutions may be carried out to give good results at temperatures, for example, between ambient temperatures and temperatures in excess of 100° F. Any one of the compounds specified as suitable for a given function may be selected to perform that function in combination with any of the others, provided only that it does not set up secondary interactions with said other components or ingredients so as to defeat the primary purpose thereof and provided that it does not react to give products which will stain the dichroic image. For example, stannous chloride is a suitable bleaching agent but it is desirable not to use said compound in conjunction with a bleach-accelerator comprising an iodide or with sodium sulfate. For similar reasons, if sodium perborate is used for bleaching, it is preferable not to employ a bleach-accelerator. However, it will now be apparent to those skilled in the art that any of the specified ingredients may be utilized by a suitable choice or elimination of the others to produce an improved dichroic image. It is also obvious that no set rules can be given and it would be difficult, if not impossible, even to set outside limits on the ranges of variation.

The invention is illustrated in the drawing by the single, diagrammatic and sectional view of a conventional image-carrying element having a light-polarized image which has been processed in accordance with the practices set forth herein. As shown, the element comprises an image-carrying layer 11 supported on a conventional support 10 of any conventional support material, for example any suitable cellulosic material such as cellulose acetate or the like. The image-carrying layer 11 is formed of molecularly oriented polyvinyl alcohol and is shown as carrying therein a light-polarizing image comprising a dichroic sorption complex of iodine stabilized with boric acid.

It is to be understood also that the term "dye" in the claims is used in a generic sense to include such materials as iodine, as well as other light-absorbing image-forming materials.

Since certain changes in carrying out the above process, and certain modificatons in the article which embody the invention may be made without departing from its scope, it is intended that all matter contained in the above description shall be interpreted as illustrative and not in a limitng sense.

What is claimed is:

1. In a method of treating an image-bearing layer comprising molecularly oriented polyvinyl alcohol having a dichroic sorption complex of iodine formed in predetermined portions of said layer to provide a light-polarizing image, the step of treating the image-bearing layer of polyvinyl alcohol and the image formed of said complex with a boric acid solution to alter the light-transmitting properties of said complex.

2. In a method of treating an image-bearing layer comprising a sheet of molecularly oriented polyvinyl alcohol having a polyvinyl alcohol-iodine sorption complex formed in predetermined portions of the sheet to provide a light-polarizing image therein, the treatment for altering the light-transmitting properties of said complex which comprises subjecting the sheet and the light-polarizing image formed of said complex to boric acid and an agent capable of reacting with iodine to form a substantially colorless water-soluble compound.

3. A method of altering the light-transmitting properties of an iodine dichroic sorption complex contained in predetermined portions of and forming a light-polarizing image in a sheet of molecularly oriented polyvinyl alcohol, comprising the treatment, in the presence of an agent for decreasing the solubility of the polyvinyl alcohol, of said sheet and the image formed of said complex with boric acid and sodium thiosulfate to effect a desired alteration of the light-transmitting properties of said image-forming complex.

4. A method of altering the light-transmitting properties of an iodine dichroic sorption complex contained in predetermined portions of and forming a light-polarizing image in a sheet of molecularly oriented polyvinyl alcohol, comprising treating said sheet and the image formed of said complex with a solution of boric acid, sodium thiosulfate and an agent for increasing the solubility of iodine in said solution whereby to effect a desired alteration of the light-transmitting properties of said image-forming complex while conducting said treatment in the presence of an agent for decreasing the solubility of said sheet in said solution.

5. A method of altering the light-transmitting properties of an iodine dichroic sorption complex contained in predetermined portions of and forming a light-polarizing image in a sheet of molecularly oriented polyvinyl alcohol, comprising treating said sheet and the image formed of said complex with a solution comprising boric acid, sodium sulfate, potassium iodide and sodium thiosulfate to effect a desired alteration of the light-transmitting properties of the complex forming said light-polarizing image.

EDWIN H. LAND.

REFERENCES CITED

The following references are of record in the file of this patent:

UNITED STATES PATENTS

| Number | Name | Date |
| --- | --- | --- |
| 2,072,302 | Hermann | Mar. 2, 1937 |
| 2,077,298 | Zelger | Apr. 13, 1937 |
| 2,108,261 | Jamieson | Feb. 15, 1938 |
| 2,162,618 | Izard | June 13, 1939 |
| 2,162,765 | Tarnoff | June 20, 1939 |
| 2,165,797 | Jones et al. | July 11, 1939 |
| 2,172,300 | Staud et al. | Sept. 5, 1939 |
| 2,173,304 | Land | Sept. 19, 1939 |
| 2,206,190 | Jamieson | July 2, 1940 |
| 2,230,981 | Toland | Feb. 4, 1941 |
| 2,237,567 | Land | Apr. 8, 1941 |
| 2,263,249 | Rogers | Nov. 18, 1941 |
| 2,286,215 | Lowe | June 16, 1942 |
| 2,289,714 | Land | July 14, 1942 |
| 2,289,715 | Land | July 14, 1942 |
| 2,299,839 | McQueen | Oct. 27, 1942 |
| 2,304,252 | Hager | Dec. 8, 1942 |
| 2,310,223 | Eaton et al. | Feb. 9, 1943 |
| 2,311,015 | Young et al. | Feb. 16, 1943 |
| 2,313,523 | Donovan et al. | Mar. 9, 1943 |
| 2,326,539 | Irany | Aug. 10, 1943 |

FOREIGN PATENTS

| Number | Country | Date |
| --- | --- | --- |
| 497,373 | Great Britain | Dec. 19, 1938 |
| 526,780 | Great Britain | Sept. 25, 1940 |
| 549,668 | Great Britain | Dec. 2, 1942 |